United States Patent
Okada

(10) Patent No.: US 9,337,485 B2
(45) Date of Patent: May 10, 2016

(54) ALKALINE BATTERY

(71) Applicant: PANASONIC CORPORATION, Osaka (JP)

(72) Inventor: Tadaya Okada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 119 days.

(21) Appl. No.: 14/344,850

(22) PCT Filed: Sep. 10, 2013

(86) PCT No.: PCT/JP2013/005352
§ 371 (c)(1),
(2) Date: Mar. 13, 2014

(87) PCT Pub. No.: WO2014/097511
PCT Pub. Date: Jun. 26, 2014

(65) Prior Publication Data
US 2014/0370376 A1    Dec. 18, 2014

(30) Foreign Application Priority Data

Dec. 20, 2012  (JP) .................................. 2012-277677

(51) Int. Cl.
*H01M 4/50* (2010.01)
*H01M 4/06* (2006.01)
*H01M 4/62* (2006.01)
(Continued)

(52) U.S. Cl.
CPC *H01M 4/50* (2013.01); *H01M 4/06* (2013.01); *H01M 4/244* (2013.01); *H01M 4/583* (2013.01); *H01M 4/62* (2013.01); *H01M 4/625* (2013.01); *H01M 6/08* (2013.01); *H01M 2004/028* (2013.01)

(58) Field of Classification Search
CPC ....... H01M 4/50; H01M 4/244; H01M 4/583; H01M 4/06; H01M 4/62; H01M 6/08; H01M 2004/028; Y02E 60/124
See application file for complete search history.

(56) References Cited

U.S. PATENT DOCUMENTS 3,677,700 A * 7/1972 Fraser .................... C01G 45/02
423/50
5,342,712 A   8/1994 Mieczkowska et al.
(Continued)

FOREIGN PATENT DOCUMENTS

EP    0863561 A1   9/1998
JP    08-510355 A  10/1996
(Continued)

OTHER PUBLICATIONS

International Search Report issued in International Application No. PCT/JP2013/005352 mailed Oct. 29, 2013, 4 pgs.
(Continued)

*Primary Examiner* — Patrick Ryan
*Assistant Examiner* — Aaron Greso
(74) *Attorney, Agent, or Firm* — McDermott Will & Emery LLP

(57) ABSTRACT

An alkaline battery including a negative electrode including zinc, a positive electrode including manganese dioxide, and an alkaline electrolyte, in which the positive electrode includes graphite particles each having a basal surface and an edge surface, and anatase titanium dioxide particles, and the anatase titanium dioxide particles have a mean particle size larger than a height of the edge surface of each graphite particle.

10 Claims, 1 Drawing Sheet

(51) Int. Cl.
*H01M 6/08* (2006.01)
*H01M 4/24* (2006.01)
*H01M 4/583* (2010.01)
*H01M 4/02* (2006.01)

(56) References Cited

U.S. PATENT DOCUMENTS

| | | | |
|---|---|---|---|
| 6,524,750 | B1 | 2/2003 | Mansuetto |
| 6,566,009 | B1 | 5/2003 | Noya et al. |
| 2004/0258994 | A1 | 12/2004 | Adachi et al. |
| 2006/0241237 | A1* | 10/2006 | Drzal ................ C08K 7/00 524/495 |
| 2009/0253040 | A1 | 10/2009 | Okada |
| 2010/0036023 | A1* | 2/2010 | Weng ............. B60C 1/0008 524/13 |
| 2010/0092808 | A1 | 4/2010 | Guerfi et al. |

FOREIGN PATENT DOCUMENTS

| | | | | |
|---|---|---|---|---|
| JP | 09-007608 | A | 10/1997 | |
| JP | 2002-500419 | A | 1/2002 | |
| JP | 2003-203635 | A | 7/2003 | |
| JP | 2005-166419 | A | 6/2005 | |
| JP | 2006-164862 | A | 6/2006 | |
| JP | 2009-043547 | A | 2/2009 | |
| JP | 2009-224077 | A | 10/2009 | |
| JP | 2009-252595 | A | 10/2009 | |
| JP | 2011-181373 | * | 9/2011 | .............. H01M 4/06 |
| WO | WO 97/13285 | * | 4/1997 | .............. H01M 4/50 |
| WO | 99/34462 | A1 | 7/1999 | |

OTHER PUBLICATIONS

Chinese Search Report issued in Chinese Patent Application No. 201380003055.1 dated Dec. 30, 2015, with English translation.

* cited by examiner

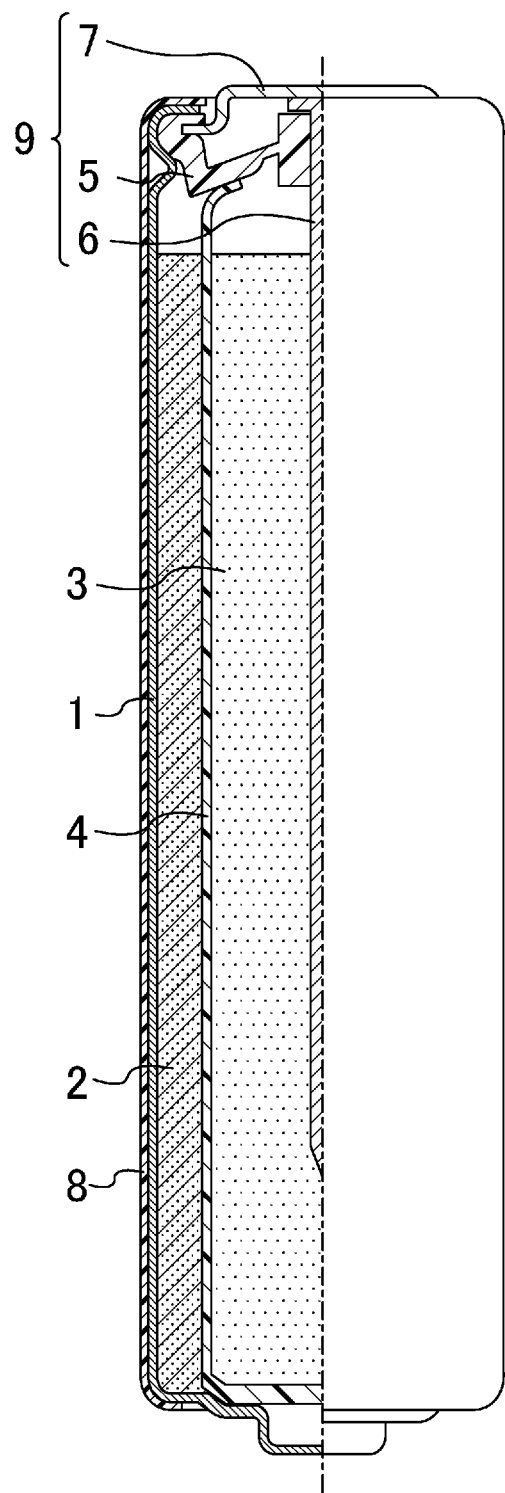

ALKALINE BATTERY

RELATED APPLICATIONS

This application is the U.S. National Phase under 35 U.S.C. §371 of International Application No. PCT/JP2013/005352, filed on Sep. 10, 2013, which in turn claims the benefit of Japanese Application No. 2012-277677, filed on Dec. 20, 2012, the disclosures of which are incorporated by reference herein.

TECHNICAL FIELD

The present disclosure relates to alkaline batteries having good storage characteristics.

BACKGROUND ART

When an alkaline battery is stored for a long period of time, zinc serving as the negative electrode active material is corroded by the electrolyte, and hydrogen gas is produced inside the battery. Consequently, the hydrogen gas increases the pressure in the battery, thereby creating a risk of electrolyte leakage. To address this problem, a zinc alloy containing a metal (an inhibitor) such as indium is generally used as the negative electrode active material.

Another known phenomenon which degrades the storage characteristics is as follows. In an alkaline battery stored for a long period of time, iron which is a base material of the battery can is corroded. Consequently, internal resistance of the battery increases, and discharge performance disadvantageously decreases. Patent document 1 describes, as a measure to address this problem, a technique to add an additive such as a titanium-containing oxide to a positive electrode. According to this technique, before iron begins to corrode, an oxidation-reduction reaction occurs between the iron and the additive, and consequently, the reaction product is deposited on the inner surface of the battery can, thereby reducing corrosion of the inner surface of the battery can.

Meanwhile, it is known that a titanium-containing oxide added to a positive electrode is effective not only in preventing rust, but also in alleviating reduction of discharge performance.

For example, it is considered that anatase titanium dioxide is effective in increasing mobility of ions when a battery is discharging. Patent Document 2 describes that addition of anatase titanium dioxide to a positive electrode inhibits polarization occurring in discharge of a battery, and consequently, reduction of discharge performance can be alleviated.

It is also considered that $Ti(OH)_4$ or $TiO(OH)_2$ effectively assists a positive electrode active material in retaining an electrolyte. Patent Document 3 describes that addition of $Ti(OH)_4$ or $TiO(OH)_2$ to a positive electrode inhibits an increase in internal resistance caused by electrolyte exhaustion at the end of discharge, and accordingly, a voltage drop occurring at the end of discharge can be alleviated.

CITATION LIST

Patent Document

PATENT DOCUMENT 1: Japanese Unexamined Patent Publication No. 2005-166419

PATENT DOCUMENT 2: Japanese Unexamined Patent Publication (Japanese Translation of PCT Application) No. H08-510355

PATENT DOCUMENT 3: Japanese Unexamined Patent Publication No. 2003-203635

SUMMARY OF THE INVENTION

Technical Problem

As emergency power sources stored in precaution against natural disasters such as an earthquake and a typhoon, there is an increasing demand for alkaline batteries which do not suffer from electrolyte leakage even during and after long term storage. However, even an alkaline battery including, as the negative electrode active material, a zinc alloy containing a metal (an inhibitor) such as indium has insufficient storage characteristics and can be stored for 3-5 years only. In order to commercialize alkaline batteries which have good storage characteristics and can be stored for 10 years or more, it is essential to develop a new technology.

An object of the present disclosure is to provide an alkaline battery which has good storage characteristics and does not suffer from electrolyte leakage even during and after storage of 10 years.

Solution to the Problem

An alkaline battery according to the present disclosure includes a negative electrode including zinc, a positive electrode including manganese dioxide, and an alkaline electrolyte, wherein the positive electrode includes graphite particles each having a basal surface and an edge surface, and anatase titanium dioxide particles, a height of the edge surface of each graphite particle is greater than 0.01 μm, and a mean particle size of the anatase titanium dioxide particles is larger than the height of the edge surface of each graphite particle.

Advantages of the Invention

According to the present disclosure, an alkaline battery which has good storage characteristics and suffers from no electrolyte leakage even during and after storage of 10 years.

BRIEF DESCRIPTION OF THE DRAWINGS

FIG. 1 is a half-cutaway view schematically illustrating a configuration of an alkaline battery.

DESCRIPTION OF EMBODIMENTS

In order to evaluate the storage characteristics of alkaline batteries, the inventor of the present disclosure conducted an accelerated test (at 80° C., for 3 months) which corresponded to storage of 10 years. An analysis of the batteries suffering from electrolyte leakage showed that iron was deposited on the negative electrode.

A possible cause of deposition of iron is corrosion of a battery can. The alkaline batteries subjected to the test, however, each included a battery can whose inner surface was covered with a carbon coating obtained by mixing and dispersing graphite, a carbon black, and a titanium compound (i.e., anatase $TiO_2$) in a resin binder. The alkaline batteries suffering from electrolyte leakage practically demonstrated no evidence of rusting of the inner surface of the battery can. Accordingly, it was unlikely that iron dissolved from the battery can had moved to the negative electrode.

In view of the foregoing, the inventor focused on, as a possible source of iron other than the battery can, the fact that iron is unavoidably mixed as an impurity in manganese dioxide to be used as a positive electrode active material in production steps of the manganese dioxide.

Usually, electrolytic manganese dioxide which is used to form a positive electrode active material of an alkaline battery is produced in the following manner. A manganese sulfate solution obtained by dissolving manganese ore in sulfuric acid is electrolyzed, thereby producing massive manganese dioxide. The massive manganese dioxide is then pulverized into powder. In these production steps, iron deriving from the manganese ore and mixed when performing the pulverization is unavoidably contained as an impurity in the manganese dioxide.

If the manganese dioxide contains iron as an impurity, the assumption is made that: The iron having been dissolved from the positive electrode into the electrolyte passes through the separator to reach the vicinity of the negative electrode, and then, is deposited on the negative electrode; the deposition of iron on zinc serving as the negative electrode active material causes hydrogen to be produced from the negative electrode; and consequently, the pressure in the battery is increased, thereby resulting in electrolyte leakage. Since manganese dioxide typically contains iron as an impurity in an amount of about 50-200 ppm, it is assumed that influence of the iron on the storage characteristics of the conventional batteries after storage of 3-5 years is so small to be overlooked, and that influence of the iron on the storage characteristics becomes apparent after storage of 10 years.

In view of the foregoing, the inventor fabricated alkaline batteries each including a positive electrode active material containing manganese dioxide to which titanium dioxide ($TiO_2$) was added so as to scavenge iron existing in the positive electrode. Evaluation of the storage characteristics of these alkaline batteries after storage of 10 years demonstrated that fewer alkaline batteries containing $TiO_2$ suffered from electrolyte leakage, as compared to the alkaline batteries containing no $TiO_2$.

The reasons for this are assumed to be as follows. In each battery suffering from no electrolyte leakage, an oxidation-reduction reaction occurred between $TiO_2$ added to the positive electrode and the iron existing in the positive electrode, thereby inhibiting the iron from being dissolved from the positive electrode into the electrolyte and moving to the vicinity of the negative electrode. Consequently, the iron of the positive electrode was inhibited from being deposited on the zinc in the negative electrode, and hydrogen gas was not produced. In this manner, the electrolyte leakage was inhibited.

Note that anatase $TiO_2$ is effective in scavenging iron whereas rutile $TiO_2$ is not effective. This is assumed to be because rutile $TiO_2$ is hardly dissolved into an electrolyte.

Although it was confirmed that the $TiO_2$ added to manganese dioxide is effective in scavenging iron, variations were observed in the effect of inhibiting the electrolyte leakage. For example, whether or not the electrolyte leakage occurred depended on differences in the form of graphite particles, which were added to the manganese dioxide to increase conductivity of the positive electrode active material.

It is assumed that other factors which inhibited the $TiO_2$ from scavenging iron caused the variations in the effect of inhibiting the electrolyte leakage.

The inventor focused on, as a possible factor inhibiting the $TiO_2$ from scavenging iron, oxygen existing in the positive electrode. The positive electrode has cavities in which the electrolyte is retained, and air (oxygen) also exists in the cavities. The assumption is made that oxygen reacts with iron to accelerate dissolution of the iron, and accordingly, the existence of oxygen in the positive electrode reduces the iron-scavenging effect of $TiO_2$.

In this regard, it should be noted as follows. As discussed above, it is possible to prevent the corrosion of iron used as the base material for the battery can by adding $TiO_2$ to the positive electrode. In that case, however, the reaction between the iron and $TiO_2$ occurs at the interface between the inner surface of the battery can and the positive electrode. The interface, where only the electrolyte exists, is free of oxygen that inhibits $TiO_2$ from preventing rust.

To test the assumption, the inventor focused on graphite having a function of adsorbing oxygen. Graphite serving as conductive particles is conventionally added in an amount of about 3-10% by mass to the positive electrode. On the other hand, $TiO_2$ is dissolved into the electrolyte to move to the vicinity of the negative electrode, and is deposited on the zinc contained in the negative electrode, resulting in production of hydrogen. Accordingly, the amount of $TiO_2$ added to the positive electrode for the purpose of preventing production of hydrogen should be smaller (e.g., 1% by mass or less) than the amount of the graphite. The $TiO_2$, which has been added in such a considerably small amount relative to the graphite to the positive electrode, is dispersed in the graphite.

A crystal of graphite particle has an edge surface and a basal surface, and the basal surface has a greater electronic conductivity than the edge surface. Accordingly, in a graphite particle, more oxygen is reduced on the basal surface, as compared to the edge surface. Adsorption of oxygen by the basal surface of graphite is facilitated by dispersing $TiO_2$ on the basal surface in a preferential manner, and consequently, it is possible to inhibit the oxygen from reducing the iron-scavenging effect of $TiO_2$. Thus, it is expected that dissolution of the iron existing in the positive electrode into the electrolyte is effectively inhibited with a small amount of $TiO_2$.

Usually, a graphite particle has, at the basal surface, a particle size which is greater than the height of the edge surface. Accordingly, the assumption is made that: In order to disperse $TiO_2$ on the basal surface in a preferential manner, it is sufficient to cause $TiO_2$ to have a mean particle size larger than the edge surface height of the graphite particle; and in this manner, $TiO_2$ are dispersed on the basal surface in a preferential manner without being dispersed on the edge surface.

To test this assumption, the inventor prepared graphite particles varying in the particles size at basal surface and the edge surface height, and $TiO_2$ particles varying in the mean particle size. The inventor fabricated alkaline batteries each including a positive electrode with a positive electrode active material ($MnO_2$) to which corresponding ones of these graphite and $TiO_2$ particles were added, and subjected the batteries to evaluation of the storage characteristics after storage of 10 years.

FIG. 1 is a half-cutaway view schematically illustrating the configuration of each of the fabricated alkaline batteries.

As illustrated in FIG. 1, the alkaline battery includes a cylindrical battery case 1 with a bottom, a positive electrode 2 having a hollow cylindrical shape and disposed in the battery case 1, a negative electrode 3 filled into the hollow of the positive electrode 2 and containing a zinc powder, and a separator 4 sandwiched between the positive electrode 2 and the negative electrode 3. The opening of the battery case 1 is sealed with a sealing unit 9 including a gasket 5 and negative electrode terminal plate 7 connected to a negative electrode current collector 6.

AA alkaline batteries (LR6) each having the configuration illustrated in FIG. 1 were fabricated in the following manner.

(1) Preparation of Positive Electrode

An electrolytic manganese dioxide powder (having a purity of 92% and containing about 100 ppm of iron as an impurity), an inexpensive graphite powder, and an alkaline electrolyte ($KOH:H_2O:ZnO=35:63:2$ (mass ratio)) were mixed together at a mass ratio of 90:10:2. Anatase $TiO_2$ was added in an amount of 0.5% by mass in terms titanium metal to the resultant mixture. This mixture for the positive electrode was compressed and formed into flakes. The flakes were pulverized, and subjected to pressure forming thereafter, thereby producing the positive electrode 2 in a hollow cylindrical form.

Three types of anatase $TiO_2$ respectively having a mean particle sizes of 0.05 μm, 0.8 μm, and 2 μm were prepared. Graphite particles having different edge surface heights ranging from 0.01 to 3 μm, and different particle sizes at basal surfaces ranging from 6 to 40 μm were prepared.

The edge surface heights and the particle sizes at basal surfaces of the graphite particles were adjusted by changing duration of pulverization performed with a mill.

The mean particle sizes of the $TiO_2$ particles and the edge surface heights and the particle sizes at basal surfaces of the graphite particles were measured in the following manner.

The positive electrode mixtures removed from the batteries were treated with a hydroxylamine hydrochloride solution to remove manganese dioxide. The residues were washed and dried thereafter. The dried residues were observed with a scanning electron microscope (a SEM) to measure the sizes of the $TiO_2$ particles and graphite particles.

Specifically, the maximum dimensions of ten $TiO_2$ particles were measured using a reflection electron image captured with an acceleration voltage of 3 kV, and the mean value calculated from the ten measurements was determined as the mean particle size of $TiO_2$ particles. The maximum dimensions of the basal surfaces of ten graphite particles were measured using a reflection electron image captured with an acceleration voltage of 5 kV, and the mean value calculated from the ten measurements was determined as the particle size at basal surface. The edge surface heights of ten graphite particles were measured using a SEM image captured with an acceleration voltage of 5 kV, and the mean value calculated from the ten measurements was determined as the edge surface height.

(2) Preparation of Negative Electrode

A zinc alloy powder (containing 200 ppm indium, 100 ppm bismuth, and 50 ppm aluminum), an alkaline electrolyte, a gelling agent (a mixture of a thickener including a polyacrylic acid powder and a water-absorbent polymer including a sodium polyacrylate powder) were mixed together at a mass ratio of 180:100:2, thereby producing a gel negative electrode 3.

(3) Assembly of Alkaline Battery

First, 10.2 g of the positive electrode 2 was inserted into the battery case 1, and pressed with a pressing jig such that the positive electrode 2 had a height of 41 mm and came in contact with the inner surface of the battery case 1. A separator 4 (made of a non-woven fabric containing, as a main material, a mixture of polyvinyl alcohol fibers and rayon fibers) was placed in the hollow of the positive electrode 2, and thereafter, 1.4 g of the alkaline electrolyte was poured into the inside of the separator 4. Next, 5.7 g of the gel negative electrode 3 was filled in the inside of the separator 4 such that the filled negative electrode 3 had a height of 41 mm. The opening of the battery case 1 was sealed with the sealing unit 9.

(4) Storage Characteristics Evaluation

Tables 1-3 show the results of storage characteristics evaluation of the alkaline batteries including the anatase $TiO_2$ varying in the mean particle size and the graphite particles varying in the particle size at basal surface and the edge surface height.

TABLE 1

| | | Edge Surface Height of Graphite Particles (μm) | | | | |
|---|---|---|---|---|---|---|
| Particles Size of $TiO_2$: 0.05 μm | | 0.01 | 0.025 | 0.4 | 1 | 3 |
| Particle Size at Basal Surface of Graphite Particles (μm) | 6 | 0 | 0 | 2 | — | — |
| | 8 | 0 | 0 | 2 | — | — |
| | 20 | 0 | 0 | 3 | — | — |
| | 36 | 0 | 0 | 3 | — | — |
| | 40 | 1 | 0 | 3 | — | — |

TABLE 2

| | | Edge Surface Height of Graphite Particles (μm) | | | | |
|---|---|---|---|---|---|---|
| Particles Size of $TiO_2$: 0.8 μm | | 0.01 | 0.025 | 0.4 | 1 | 3 |
| Particle Size at Basal Surface of Graphite Particles (μm) | 6 | 0 | 0 | 0 | 2 | — |
| | 8 | 0 | 0 | 0 | 2 | — |
| | 20 | 0 | 0 | 0 | 3 | — |
| | 36 | 1 | 0 | 0 | 3 | — |
| | 40 | 1 | 0 | 0 | 4 | — |

TABLE 3

| | | Edge Surface Height of Graphite Particles (μm) | | | | |
|---|---|---|---|---|---|---|
| Particles Size of $TiO_2$: 2 μm | | 0.01 | 0.025 | 0.4 | 1 | 3 |
| Particle Size at Basal Surface of Graphite Particles (μm) | 6 | 0 | 0 | 0 | 0 | 2 |
| | 8 | 0 | 0 | 0 | 0 | 2 |
| | 20 | 1 | 0 | 0 | 0 | 3 |
| | 36 | 0 | 0 | 0 | 0 | 2 |
| | 40 | 1 | 0 | 0 | 0 | 5 |

Table 1 shows the storage characteristics of the alkaline batteries including the anatase $TiO_2$ having a mean particle size of 0.05 μm and the graphite particles varying in the particle size at basal surface and the edge surface height. Combinations of the particle size at basal surface and the edge surface height of the graphite particles are shown in a matrix manner.

In a similar manner, Tables 2 and 3 show the storage characteristics of the alkaline batteries including anatase $TiO_2$ and the graphite particles varying in the particle size at basal surface and the edge surface height. The batteries shown in Table 2 included the anatase $TiO_2$ having the mean particle size of 0.8 μm, and those shown in Table 3 included the anatase $TiO_2$ having the mean particle size of 2 μm. Both tables show combinations of the particle size at basal surface and the edge surface height of the graphite particles in a matrix manner.

The evaluation of the storage characteristics was made in the following manner: Groups each constituted by 100 batteries including graphite particles having a corresponding combination of the particle size at basal surface and the edge surface height were subjected to storage of 3 months at 80° C. (corresponding to storage of 10 years at room temperature), and the number of batteries which suffered from electrolyte leakage was counted to make the evaluation. For example, Table 1 shows that electrolyte leakage occurred in one battery among 100 batteries including the graphite particles having a particle size of 6 μm at basal surface and an edge surface height of 0.01 μm. In the tables, the cells filled with no numeric values represent that the corresponding batteries were not subjected to the storage characteristic evaluation.

Table 1 shows that, in respect of the groups of the batteries including the anatase $TiO_2$ having a mean particle size of 0.05 μm, electrolyte leakage occurred in at least one battery of each group except the group of the batteries including the graphite particles having an edge surface height of 0.025 μm. Table 2 shows that, in respect of the groups of the batteries including the anatase $TiO_2$ having a mean particle size of 0.8 μm, electrolyte leakage occurred in at least one battery of each group except the groups of the batteries including the graphite particles having an edge surface height of 0.025-0.4 μm. Further, Table 3 shows that, in respect of the groups of the batteries including the anatase $TiO_2$ having a mean particle size of 2 μm, electrolyte leakage occurred in at least one battery of each group except the groups of the batteries including the graphite particles having an edge surface height of 0.025-1 μm.

As shown in Tables 1-3, electrolyte leakage occurred in part of the alkaline batteries including the graphite particles having an edge surface height of 0.01 μm. This is assumed to be because the graphite particles whose edge surface height was excessively small were thin and brittle, and the graphite particles were crushed when mixing the materials for the positive electrode, resulting in reduction of the oxygen-adsorbing effect of the graphite.

The above results demonstrate that alkaline battery which do not suffer from electrolyte leakage even during and after storage of 10 years can be obtained by using graphite particles having an edge surface height of 0.01 μm or more and anatase $TiO_2$ having a mean particle size larger than the edge surface height of the graphite particles. This is assumed to be because: anatase $TiO_2$ having a mean particle size larger than the edge surface height of the graphite particles are dispersed, in a preferential manner, on the basal surfaces of the graphite which are capable of reducing much oxygen, and oxygen adsorption by the graphite is facilitated, thereby inhibiting the existence of oxygen from reducing the iron-scavenging effect of the $TiO_2$. As a result, an oxidation-reduction reaction occurs between the iron that unavoidably exists in the positive electrode and the $TiO_2$ added to the positive electrode, thereby enabling the battery to inhibit the iron from being dissolved and moving to the vicinity of the negative electrode. Thus, the alkaline battery in which no electrolyte leakage occurs even during and after storage of 10 years can be obtained.

In order to allow the graphite to exert the oxygen-adsorbing effect, it is preferable that the graphite particles have an edge surface height ranging from 0.025 to 1 μm.

In order to allow the $TiO_2$ to exert the iron-scavenging effect, it is preferable that the $TiO_2$ has a mean particle size ranging from 0.05 to 2 μm. If the $TiO_2$ had a mean particle size smaller than 0.05 μm, it would become difficult to disperse the $TiO_2$ in the positive electrode and the $TiO_2$ could exert the iron-scavenging effect insufficiently. If the $TiO_2$ had a mean particle size larger than 2 μm, the $TiO_2$ would have a small surface area and could exert the iron-scavenging effect insufficiently. Further, it is preferable the mean particle size of the $TiO_2$ is at least twice as large as the edge surface height of the graphite particles.

As described above, according to the present disclosure, anatase $TiO_2$ is added to the positive electrode, and the graphite particles have an edge surface height of 0.01 μm or more while causing the $TiO_2$ to have a mean particle size larger than the edge surface height. Accordingly, it is possible to inhibit the iron that unavoidably exists in the positive electrode from being dissolved by causing an oxidation-reduction reaction between the iron and $TiO_2$. It is consequently possible to inhibit the iron existing in the positive electrode from being deposited on the zinc contained in the negative electrode, and the risk caused by production of hydrogen gas and leading to electrolyte leakage can be prevented. As a result, an alkaline battery which has good storage characteristics and suffers from no electrolyte leakage even during and after storage of 10 years can be obtained.

Next, conditions for obtaining a more reliable alkaline battery in which no electrolyte leakage occurs even during and after storage over 10 years were determined by optimizing the following parameters.

(1) Particle Size at Basal Surface of Graphite Particles

Groups each including 100 alkaline batteries and being different in the particle size at basal surface of graphite particles were subjected to storage of 3 months at 80° C. (corresponding to storage of 10 years at room temperature) and storage of 4 months at 80° C. (corresponding to storage of 13 years at room temperature). The particle size at basal surface ranged from 6 to 40 μm. Table 4 shows the numbers of batteries in which electrolyte leakage occurred on a group-by-group basis.

In this evaluation, the graphite particles had an edge surface height of 0.4 μm, and $TiO_2$ having a mean particle size of 0.8 μm was added in an amount of 0.5% by mass (in terms of titanium metal).

TABLE 4

| Particle Size at Basal Surface of Graphite Particles (μm) | Number of Batteries Suffering from Electrolyte Leakage | |
|---|---|---|
| | Storage of 3 Months at 80° C. | Storage of 4 Months at 80° C. |
| 6 | 0 | 0 |
| 8 | 0 | 0 |
| 20 | 0 | 0 |
| 30 | 0 | 0 |
| 36 | 0 | 1 |
| 40 | 0 | 2 |

As shown in Table 4, it was possible to obtain alkaline batteries in which no electrolyte leakage occurs even during and after storage of 13 years by causing the graphite particles to have a particle size at basal surface ranging from 6 to 30 μm.

(2) Amount of $TiO_2$ Added to Positive Electrode

Groups each including 100 alkaline batteries and being different in the amount of $TiO_2$ added to the positive electrode were subjected to storage of 3 months at 80° C. (corresponding to storage of 10 years at room temperature) and storage of 4 months at 80° C. (corresponding to storage of 13 years at room temperature). The amount of $TiO_2$ ranged from 0.02 to 0.94% by mass (in terms of titanium metal). Table 5 shows the numbers of batteries in which electrolyte leakage occurred on a group-by-group basis.

In this evaluation, the graphite particles had an edge surface height of 0.4 μm and a particle size of 20 μm at basal surface, and $TiO_2$ had a mean particle size of 0.8 μm.

TABLE 5

| Amount of Added TiO$_2$ (in Terms of Titanium Metal, %) | Number of Batteries Suffering from Electrolyte Leakage | |
|---|---|---|
| | Storage of 3 Months at 80° C. | Storage of 4 Months at 80° C. |
| 0.02 | 0 | 6 |
| 0.05 | 0 | 2 |
| 0.07 | 0 | 0 |
| 0.15 | 0 | 0 |
| 0.50 | 0 | 0 |
| 0.84 | 0 | 1 |
| 0.94 | 0 | 3 |

As shown in Table 5, it was possible to obtain alkaline batteries in which no electrolyte leakage occurs even during and after storage of 13 years by adding the TiO$_2$ in an amount ranging from 0.07 to 0.50% by mass (in terms of titanium metal). It is assumed that, in the batteries to which 0.84% by mass or more of the TiO$_2$ was added, an excessive amount of the TiO$_2$ was dissolved to move to the negative electrode, and titanium was deposited on the surface of zinc, thereby causing electrolyte leakage due to production of a large amount of hydrogen.

As shown in Table 5, it was possible to obtain alkaline batteries in which no electrolyte leakage occurs even during and after storage of 10 years by adding the TiO$_2$ in an amount ranging from 0.02 to 0.94% by mass (in terms of titanium metal).

(3) Ratio of Amount of Added Graphite to Amount of Added TiO$_2$

Alkaline batteries varying in the amount of the TiO$_2$ added to the positive electrode and the amount of graphite added to the positive electrode were fabricated. Specifically, in this evaluation, the amount of added TiO$_2$ was represented by A % by mass (in terms of titanium metal) and ranged from 0.07 to 0.94% by mass, and the amount of added graphite was represented by B % by mass and ranged from 3 to 12% by mass. Table 6 shows ratios B/A in a matrix manner. For example, in Table 6, when the amount of added TiO$_2$ is 0.07% by mass and the amount of added graphite is 3% by mass, the ratio B/A is 42.9.

In this evaluation, the graphite particles had an edge surface height of 0.4 μm and a particle size of 20 μm at basal surface, and TiO$_2$ had a mean particle size of 0.8 μm.

TABLE 6

| | Amount of Graphite Added to Positive Electrode (B % by mass) | | | |
|---|---|---|---|---|
| | 3 | 5 | 10 | 12 |
| Amount of TiO$_2$ Added to Positive Electrode (A % by mass) 0.07 | 42.9 | 71.4 | 142.9 | 171.4 |
| 0.50 | 6.0 | 10.0 | 20.0 | 24.0 |
| 0.94 | 3.2 | 5.3 | 10.6 | 12.8 |

Groups each including 100 alkaline batteries and being different in the ratio B/A as shown in Table 6 in a matrix manner were subjected to storage of 4 months at 80° C. (corresponding to storage of 13 years at room temperature). Table 7 shows numbers of batteries in which electrolyte leakage occurred on a group-by-group basis.

TABLE 7

| | Amount of Graphite Added to Positive Electrode (B % by mass) | | | |
|---|---|---|---|---|
| | 3 | 5 | 10 | 12 |
| Amount of TiO$_2$ Added to Positive Electrode (A % by mass) 0.07 | 0 | 0 | 0 | 2 |
| 0.50 | 0 | 0 | 0 | 0 |
| 0.94 | 3 | 0 | 0 | 0 |

As shown in Table 7, it was possible to obtain alkaline batteries in which no electrolyte leakage occurs even during and after storage of 13 years by adjusting the ratio B/A of the amount of added graphite to the amount of added TiO$_2$ within the range from 5.3 to 142.9. It is assumed that: when the ratio B/A was equal to or smaller than 3.2, the amount of graphite was too small to exert the oxygen-adsorbing effect; and when the ratio B/A was equal to or greater than 171.4, the graphite existed in an excessively large amount, and the dispersibility and the oxygen-adsorbing effect of the graphite were reduced.

(4) Density of Manganese Dioxide in Positive Electrode

Groups each including 100 alkaline batteries and being different in density of manganese dioxide (MnO$_2$) contained in the positive electrode were subjected to storage of 3 months at 80° C. (corresponding to storage of 10 years at room temperature) and storage of 4 months at 80° C. (corresponding to storage of 13 years at room temperature). The density of MnO$_2$ ranged from 2.3 to 2.9 g/cm$^3$. Table 8 shows the numbers of batteries in which electrolyte leakage occurred on a group-by-group basis.

In this evaluation, the graphite particles had an edge surface height of 0.4 μm and a particle size of 20 μm at basal surface, the TiO$_2$ had a mean particle size of 0.8 μm, and the mass ratio between the MnO$_2$ and graphite was 90:10. The density of MnO$_2$ of the positive electrode was adjusted by changing the mass of the positive electrode while making no change to the height (41 mm) of the positive electrode.

TABLE 8

| Density of MnO$_2$ (g/cm$^3$) | Number of Batteries Suffering from Electrolyte Leakage | |
|---|---|---|
| | Storage of 3 Months at 80° C. | Storage of 4 Months at 80° C. |
| 2.3 | 0 | 5 |
| 2.4 | 0 | 3 |
| 2.5 | 0 | 0 |
| 2.6 | 0 | 0 |
| 2.7 | 0 | 0 |
| 2.8 | 0 | 1 |
| 2.9 | 0 | 2 |

As shown in Table 8, it was possible to obtain alkaline batteries in which no electrolyte leakage occurs even during and after storage of 13 years by adjusting the density of the MnO$_2$ contained in the positive electrode within the range from 2.5 to 2.7 g/cm$^3$. It is assumed that: when the density of MnO$_2$ of the positive electrode was equal to or smaller than 2.4 g/cm$^3$, the positive electrode included therein too many cavities, and accordingly, too much oxygen, thereby allowing the graphite to exert the oxygen-adsorbent effect insufficiently; and when the density of MnO$_2$ of the positive electrode was equal to or greater than 2.8 g/cm$^3$, the positive electrode included too few cavities and an insufficient amount of the electrolyte was supplied, thereby reducing the oxygen-adsorbing effect of the graphite.

The density of the $MnO_2$ contained in the positive electrode can be calculated by dividing the weight of the $MnO_2$ by the volume of the positive electrode.

The volume of the positive electrode can be calculated based on an outer diameter, an inner diameter, and a height measured using an X-ray fluoroscopic image of the battery, for example.

For example, the weight of the $MnO_2$ contained in the positive electrode can be calculated in the following manner. The entire positive electrode is removed from a disassembled battery, and then, subjected to acid dissolution in a sufficient manner. Thereafter, undissolved part is separated by filtration to obtain a sample solution. A content of manganese (Mn) in the sample solution is obtained with IPC spectroscopic analysis (high-frequency inductively coupled plasma spectroscopic analysis). The content is converted into an amount of manganese dioxide ($MnO_2$), and the obtained amount can be deemed to the weight of the $MnO_2$ contained in the positive electrode.

(5) Potential of Manganese Dioxide

Groups each including 100 alkaline batteries and being different in the potential of manganese dioxide ($MnO_2$) relative to an Hg/HgO reference electrode were subjected to storage of 3 months at 80° C. (corresponding to storage of 10 years at room temperature) and storage of 4 months at 80° C. (corresponding to storage of 13 years at room temperature). The potential of $MnO_2$ ranged from 240 to 340 mV in an aqueous solution containing 40% by mass of KOH and being at a temperature of 25±1° C. Table 8 shows the numbers of batteries in which electrolyte leakage occurred on a group-by-group basis.

In this evaluation, the graphite particles had an edge surface height of 0.4 μm and a particle size of 20 μm at basal surface, and $TiO_2$ having a mean particle size of 0.8 μm was added in an amount of 0.5% by mass (in terms of titanium metal).

TABLE 9

| Potential of $MnO_2$ (mV) | Number of Batteries Suffering from Electrolyte Leakage | |
|---|---|---|
| | Storage of 3 Months at 80° C. | Storage of 4 Months at 80° C. |
| 240 | 0 | 4 |
| 260 | 0 | 2 |
| 280 | 0 | 0 |
| 300 | 0 | 0 |
| 320 | 0 | 1 |
| 340 | 0 | 3 |

As shown in Table 9, it was possible to obtain alkaline batteries in which no electrolyte leakage occurs even during and after storage of 13 years by adjusting the potential of the $MnO_2$ within the range from 280 to 300 mV. It is assumed that: when the potential of the $MnO_2$ was equal to or lower than 260 mV, the $MnO_2$ became porous due to low crystallinity and easily contained oxygen, thereby allowing the graphite to exert the oxygen-adsorbing effect insufficiently; and when the open circuit potential of the $MnO_2$ was equal to or higher than 320 mV, the gap between the open circuit potential and a reduction potential of oxygen became large, and reduction of oxygen was easily inhibited, thereby reducing the oxygen-adsorbing effect of the graphite.

The potential of $MnO_2$ can be measured in the following manner.

First, 20 g of electrolytic manganese dioxide weighed with an even balance is put into a centrifuging tube of 50 ml. Next, 20 ml of an aqueous solution containing 40% by mass of potassium hydroxide is poured into the centrifuging tube, which is then lightly shaken. After sealing the opening of the centrifuging tube, the centrifuging tube is stored for 24 hours at 25±1° C. The centrifuging tube is set in a centrifuge to perform solids-liquid separation. Next, a platinum electrode with a diameter of 0.5 mm is inserted such that the platinum electrode comes into contact with the solid in a bottom portion of the centrifuging tube while immersing an end of the Hg/HgO reference electrode in the supernatant liquid in the centrifuging tube. Thereafter, the platinum electrode is connected to the positive terminal of a digital voltmeter, and the Hg/HgO reference electrode is connected to the negative terminal of the digital voltmeter. The voltage read in this manner corresponds to the potential of the electrolytic manganese dioxide relative to the Hg/HgO reference electrode.

The present disclosure has been described with reference to the preferred embodiments. However, it should be noted that the present disclosure is not limited to the above descriptions, and various modifications can be made to the present disclosure as a matter of course.

INDUSTRIAL APPLICABILITY

The present disclosure is useful for alkaline batteries which are stored for a long period of time.

DESCRIPTION OF REFERENCE CHARACTERS

1 Battery case
2 Positive electrode
3 Negative electrode
4 Separator
5 Gasket
6 Negative electrode current collector
7 Negative electrode terminal plate
9 Sealing unit

The invention claimed is:

1. An alkaline battery, comprising:
a negative electrode including zinc;
a positive electrode including manganese dioxide; and
an alkaline electrolyte, wherein:
the manganese dioxide contains iron,
the positive electrode includes graphite particles each having a basal surface and an edge surface, and anatase titanium dioxide particles,
a height of the edge surface of each graphite particle is in a range from 0.025 to 1 μm,
each graphite particle has, at the basal surface, a particle size in the range from 6 to 40 μm,
a mean particle size of the anatase titanium dioxide particles is larger than the height of the edge surface of each graphite particle, and
the mean particle size of the anatase titanium dioxide particles is in a range from 0.05 to 0.8 μm.

2. The alkaline battery of claim 1, wherein
the mean particle size of the anatase titanium dioxide particles is at least twice as large as the height of the edge surface of each graphite particle.

3. The alkaline battery of claim 1, wherein each graphite particle has, at the basal surface, the particle size in the range from 6 to 30 μm.

4. The alkaline battery of claim 1, wherein
the anatase titanium dioxide particles are preferentially dispersed on the basal surface of each graphite particle.

5. The alkaline battery of claim 1, wherein
an amount of the anatase titanium dioxide particles added to the positive electrode is in the range from 0.02 to 0.94% by mass in terms of titanium metal.

6. The alkaline battery of claim 1, wherein
an amount of the anatase titanium dioxide particles added to the positive electrode is in the range from 0.07 to 0.5% by mass in terms of titanium metal.

7. The alkaline battery of claim 1, wherein
a ratio B/A is in the range from 5.3 to 142.9, where A is an amount in terms of titanium metal of the anatase titanium dioxide particles added to the positive electrode, B is an amount of the graphite particles added to the positive electrode, and A and B are expressed in percent by mass.

8. The alkaline battery of claim 1, wherein
a density of the manganese dioxide included in the positive electrode is in the range from 2.5 to 2.7 g/cm$^3$.

9. The alkaline battery of claim 1, wherein
in an aqueous solution containing 40% by mass of KOH and being at a temperature of 25 ±1° C., a potential of the manganese dioxide relative to an Hg/HgO reference electrode is in the range from 280 to 300 mV.

10. The alkaline battery of claim 2, wherein
the mean particle size of the anatase titanium dioxide particles is in the range from 0.05 to 2 μm.

* * * * *